United States Patent
Wu et al.

(10) Patent No.: US 7,089,273 B2
(45) Date of Patent: Aug. 8, 2006

(54) METHOD AND APPARATUS FOR IMPROVING THE PERFORMANCE OF GARBAGE COLLECTION USING STACK TRACE CACHE

(75) Inventors: Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 463 days.

(21) Appl. No.: 10/632,474

(22) Filed: Aug. 1, 2003

(65) Prior Publication Data

US 2005/0027761 A1 Feb. 3, 2005

(51) Int. Cl.
*G06F 17/30* (2006.01)
(52) U.S. Cl. .................................. 707/206; 707/103 Z
(58) Field of Classification Search ..... 707/103 R–103 Z, 200, 201, 206; 711/6, 113, 118
See application file for complete search history.

(56) References Cited

U.S. PATENT DOCUMENTS

| | | | | |
|---|---|---|---|---|
| 5,848,423 A | * | 12/1998 | Ebrahim et al. | 707/206 |
| 5,893,121 A | * | 4/1999 | Ebrahim et al. | 707/206 |
| 6,101,580 A | | 8/2000 | Agesen et al. | |
| 6,317,869 B1 | * | 11/2001 | Adl-Tabatabai et al. | 717/132 |
| 6,470,361 B1 | | 10/2002 | Alpern et al. | |
| 6,748,503 B1 | * | 6/2004 | Morrison | 711/159 |
| 6,978,285 B1 | * | 12/2005 | Li | 707/206 |
| 2003/0126352 A1 | | 7/2003 | Barrett | |

* cited by examiner

*Primary Examiner*—Dennis Vautrot
*Assistant Examiner*—Cheryl Lewis
(74) *Attorney, Agent, or Firm*—Guojun Zhou

(57) ABSTRACT

An arrangement is provided for using a stack trace cache when performing root set enumeration in a stack of a thread during garbage collection. During the first root set enumeration in the stack, full stack unwinding may be performed and a stack trace cache may be created to cache stack trace information relating to stack frames. Subsequent sessions of root set enumeration in the stack may access and copy parts or the entire cached stack trace information instead of performing full stack unwinding.

32 Claims, 8 Drawing Sheets

METHOD AND APPARATUS FOR IMPROVING THE PERFORMANCE OF GARBAGE COLLECTION USING STACK TRACE CACHE

RESERVATION OF COPYRIGHT

A portion of the disclosure of this patent document contains materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to garbage collection and, more specifically, to root set enumeration in a garbage collection process.

2. Description

The function of garbage collection, i.e., automatic reclamation of computer storage, is to find data objects that are no longer in use and make their space available for reuse by running programs. Garbage collection is important to avoid unnecessary complications and subtle interactions created by explicit storage allocation, to reduce the complexity of program debugging, and thus to promote fully modular programming and increase software application portability. Because of its importance, garbage collection is becoming an integral part of managed runtime environments.

The basic functioning of a garbage collector may comprise three phases. In the first phase, all direct references to objects from currently running programs for all threads may be identified. These references are called roots, or together a root set, and a process of identifying all of such references may be called root set enumeration. In the second phase, all objects reachable from the root set may be searched since these objects may be used in the future. An object that is reachable from any reference in the root set is considered a live object; otherwise it is considered a garbage object. An object reachable from a live object is also live. The process of finding all live objects reachable from the root set may be referred to as live object tracing (or marking and scanning). In the third phase, storage space of garbage objects may be reclaimed (garbage reclamation). This phase may be conducted either by a garbage collector or a running application (usually called a mutator). In practice, these three phases, especially the last two phases, may be functionally or temporally interleaved and a reclamation technique may be strongly dependent on a live object tracing technique. Depending where root set enumeration occurs, the root set enumeration may be called register root set enumeration (hereinafter register enumeration), heap root set enumeration (hereinafter heap enumeration), or stack root set enumeration (hereinafter stack enumeration). Compared to stack enumeration, overheads incurred by root set enumeration in other storage areas are usually small in a typical application and may be ignored.

When free storage space is running below a limit, garbage collection may be invoked and all threads may be suspended so that root set enumeration for each thread may be started (for concurrent garbage collection, some threads might not be suspended in order to invoke root set enumeration). For stack enumeration for a thread, the stack frame (in the thread's stack) where the thread is suspended becomes a current frame from which stack enumeration may start. All live references in the current frame may be identified and enumerated. After the current frame is enumerated, the next stack frame (i.e., a caller's frame) in a call stack becomes a current frame in which all live references may be identified. This process, which is referred to as stack unwinding, continues until all frames in a call chain are walked through and enumerated.

A stack unwinding mechanism involved in the stack enumeration in a garbage collector unwinds or walks up stack frames of a call stack, one frame at a time, to identify currently active references, i.e., references to form a root set. For some applications, especially those with a large number of threads and a deep call chain per thread, stack unwinding incurs significant runtime overhead for garbage collection. The more threads there are and the deeper the call chain is per thread, the higher the runtime overhead that may be used. Therefore, it is desirable to improve the efficiency of stack enumeration by reducing the overhead incurred by stack unwinding.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for improving the performance of root set enumeration for garbage collection using at least one stack trace cache. The present invention may be used to reduce the overhead of stack enumeration during garbage collection in software applications with a large number of threads and a deep call chain per thread, without much cost. In many software applications, a function call chain in a thread may be repetitive, that is, caller and callee relationships might not change much, from one garbage collection session to the next. Such a characteristic may result in similar or partly similar stack traces for two consecutive garbage collection sessions. Thus, a stack trace cache may be used for the thread to store stack trace information, which reflects caller-callee relationships in a call chain. The stack trace information may comprise a list of stack frames, context information associated with each frame, current instruction pointer (IP), and/or source line number information. In the first stack enumeration (the first session of garbage collection), full stack unwinding may be performed and a stack trace cache may be created to store trace information for each frame in a stack. In the second or later stack enumeration (the second or later session of garbage collection), part or all work involved in full stack unwinding may be avoided by simply retrieving repetitive portions of stack trace information from the stack trace cache. Also in the second or later stack enumeration, the stack trace cache may be modified to accommodate new traces and/or to update old traces.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
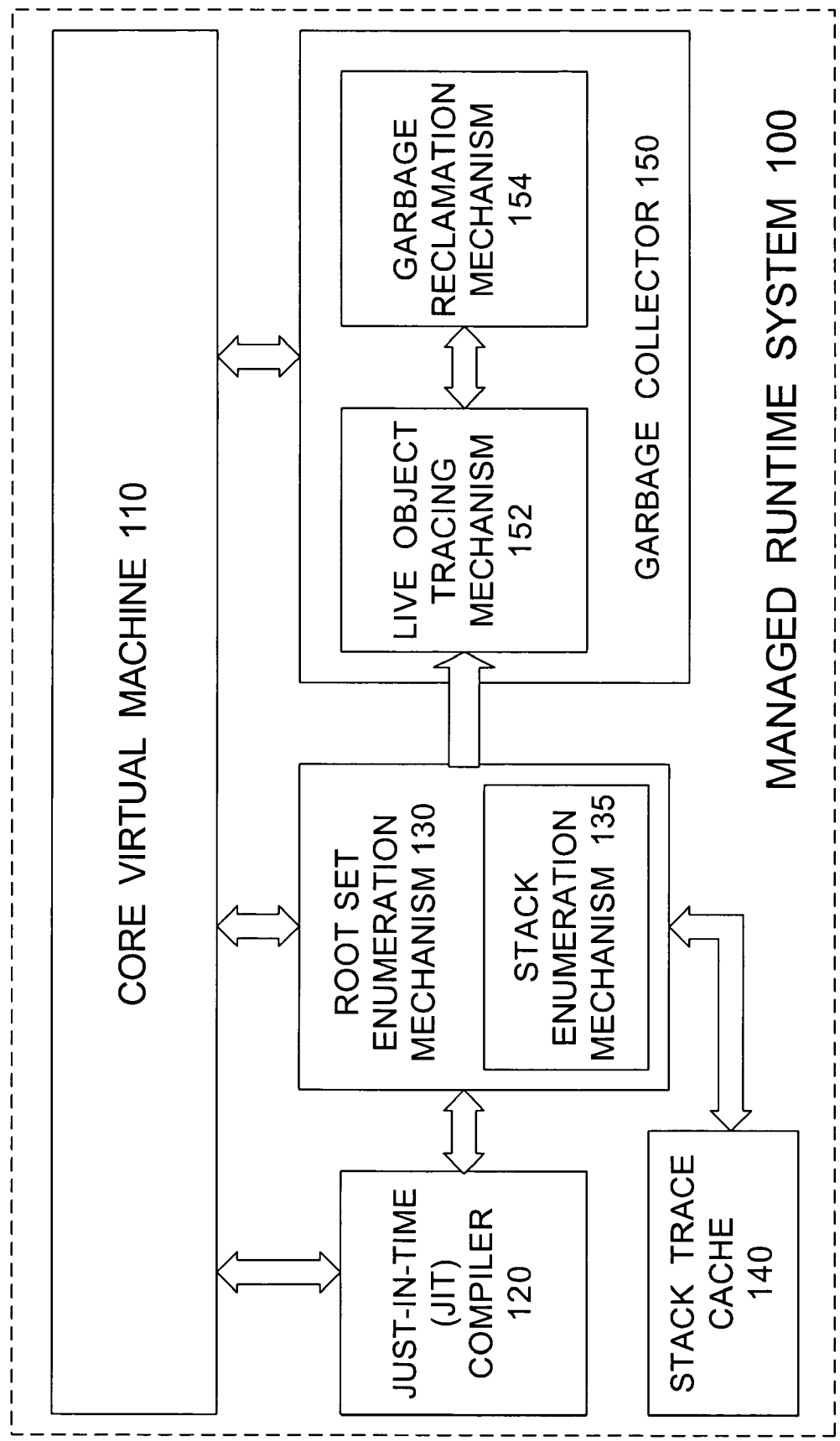
FIG. 1 depicts a high-level framework of an example managed runtime system that uses at least one stack trace cache to improve the performance of garbage collection, according to an embodiment of the present invention.

FIG. 1 depicts a high-level framework of an example managed runtime system that uses at least one stack trace cache to improve the performance of garbage collection, according to an embodiment of the present invention. The managed runtime system 100 may comprise a core virtual machine (VM) 110, at least one Just-In-Time (JIT) compiler 120, a root set enumeration mechanism 130, at least one stack trace cache 140, and a garbage collector 150. The core VM 110 is an abstract computing machine implemented in software on top of a hardware platform and operating system. The use of a VM makes software programs independent from different hardware and operating systems. A VM may be called Java Virtual Machine (JVM) for Java programs, any may be referred to as other names such as, for example, Common Language Infrastructure (CLI) for C# programs. In order to use a VM, a program must first be compiled into an architecture-neutral distribution format, i.e., intermediate language such as, for example, bytecode for a Java code. The VM interprets the intermediate language and executes the code on a specific computing platform. However, the interpretation by the VM typically imposes an unacceptable performance penalty to the execution of a bytecode because of large runtime overhead processing. A JIT compiler has been designed to improve the VM's performance. The JIT compiler 120 compiles the intermediate language of a given method into a native code of the underlying machine before the method is first called. The native code of the method is stored in memory and any later calls to the method will be handled by this faster native code, instead of by the VM's interpretation.

The root set enumeration mechanism 130 may identify initial live references (roots) in a stack, registers, and other storage areas. The root set enumeration mechanism may be a part of the core VM 110, a part of a garbage collector, a part of both the core VM and the garbage collector, or separate from either the core VM or the garbage collector. The root set enumeration mechanism may comprise a stack enumeration mechanism 135 to identify live references in a stack, a register enumeration component to identify live references in registers, and other components to identify live references in other storage areas. Since stack enumeration may incur more overhead than enumeration in registers and other areas, a stack trace cache 140 may be used to reduce stack enumeration overhead for a thread. A stack trace cache may comprise a storage space in memory. In one embodiment, the stack trace cache may be implemented using dynamic and scalable data structures such as, for example, a linked list.

The stack enumeration mechanism 135 may use a stack trace cache to store stack trace information for a thread. The stack trace information may comprise a list of stack frames, context information associated with each frame, current instruction pointer (IP), and/or source line number information. During the first stack enumeration (for the first garbage collection session), the stack enumeration mechanism may create a stack trace cache and cache the stack trace information in the stack trace cache, while the stack enumeration mechanism walks through and enumerates every frame in a stack, i.e., unwinds the entire stack. During the second or later stack enumeration (for the second or later garbage collection session), the stack enumeration mechanism may first start to walk through each frame in the stack. For a frame, the stack enumeration mechanism may detect if trace information starting from the frame is cached in the stack trace cache. If the trace information starting from the frame is cached, it may mean that the stack enumeration mechanism can directly use the trace information without further unwinding the stack. On the other hand, if the trace information starting from the frame is not cached, or has changed since the last stack enumeration, the stack enumeration mechanism may modify the stack trace cache to cache the new or updated trace information. After the second or later stack enumeration, the stack enumeration mechanism may update stack trace information in the stack trace cache.

The garbage collector 150 may comprise a live object tracing mechanism 152 and a garbage reclamation mechanism 154. The live object tracing mechanism 152 may search a storage space to find all objects reachable from a root set. Since these objects may be used in the future, they are considered live objects. The live object tracing mechanism may mark these objects as live objects and further scan to find any other live objects these objects can reach. Objects other than live objects are considered garbage objects whose storage space may be reclaimed by the garbage reclamation mechanism 154. In practice, the live object tracing mechanism and the garbage reclamation mechanism may be functionally interleaved and a reclamation technique may be strongly dependent on a live object marking technique. The garbage reclamation mechanism may reclaim garbage objects' space with or without moving live objects to a contingent area at one end of the storage space. In one embodiment, the garbage reclamation mechanism may be a part of a mutator rather than a garbage collector.

Figure 2:
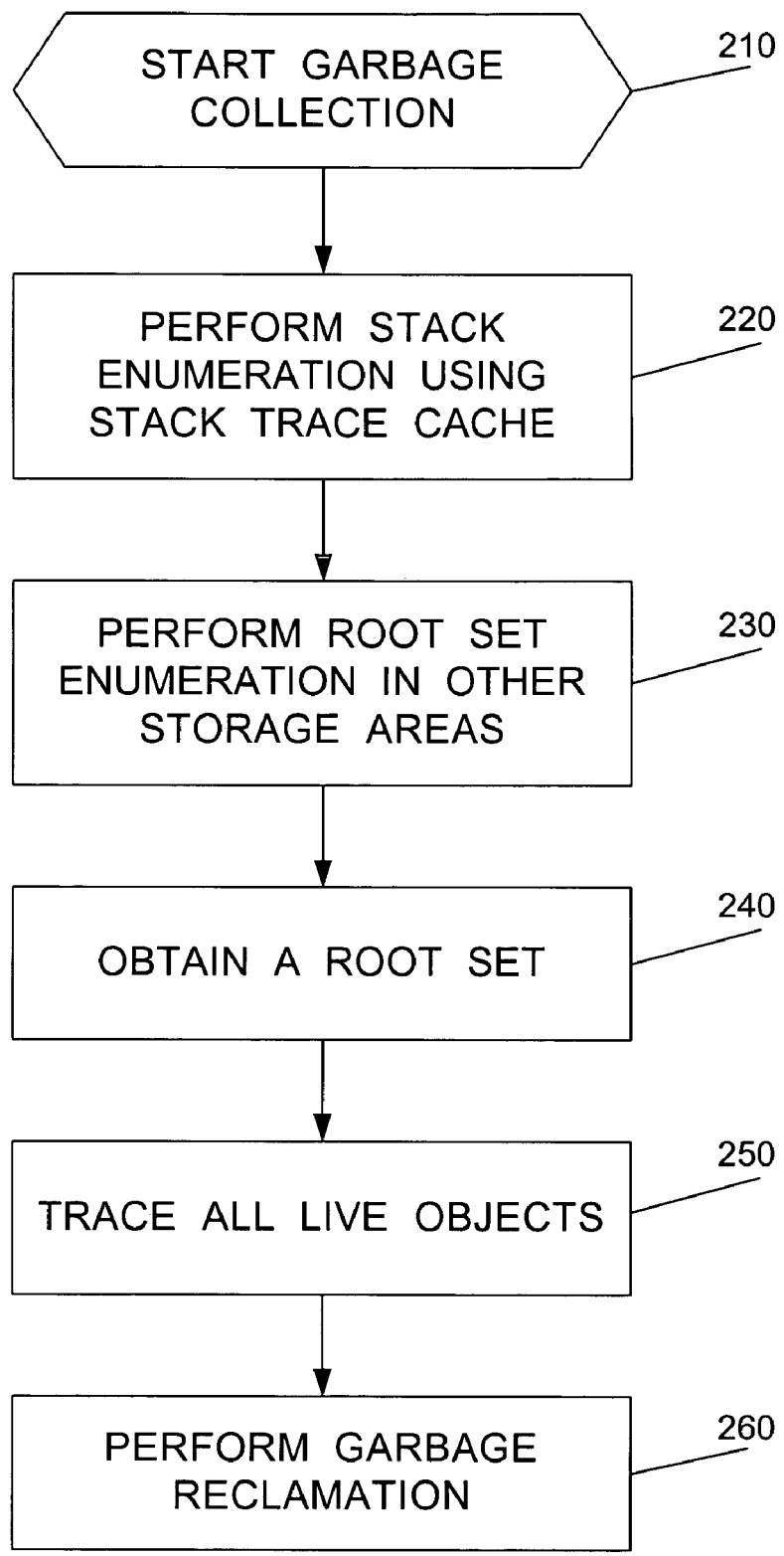
FIG. 2 is an exemplary flow diagram of a high-level process in which a stack trace cache is used during root set enumeration for garbage collection in a managed runtime system, according to an embodiment of the present invention.

FIG. 2 is an exemplary flow diagram of a high-level process in which a stack trace cache is used during root set enumeration for garbage collection in a managed runtime system, according to an embodiment of the present invention. At block 210, a garbage collection session may be initiated. At block 220, stack enumeration may be performed using a stack trace cache. A stack trace cache may be created during the first stack enumeration for a thread to cache stack trace information when full stack unwinding is performed. During a later session of stack enumeration for the thread, part or all of cached stack trace information may be retrieved without conducting full stack unwinding, if it has not changed from the last stack enumeration session. For those frames whose trace information has changed, stack unwinding may be performed and the stack trace cache may be modified to accommodate updated stack trace information. At block 230, root set enumeration in other storage areas may be performed to find live references in other storage areas such as registers. Blocks 220 and 230 may be performed concurrently, or in a reverse order without affecting the spirit of the present invention. At block 240, live references obtained during stack enumeration and root set enumeration in other storage areas may be put together to form a root set. At block 250, a storage space may be searched to mark and scan all live objects reachable from references in the root set. At block 260, all those objects in the storage space that are not marked may be considered garbage and their space may be reclaimed.

Figure 3:
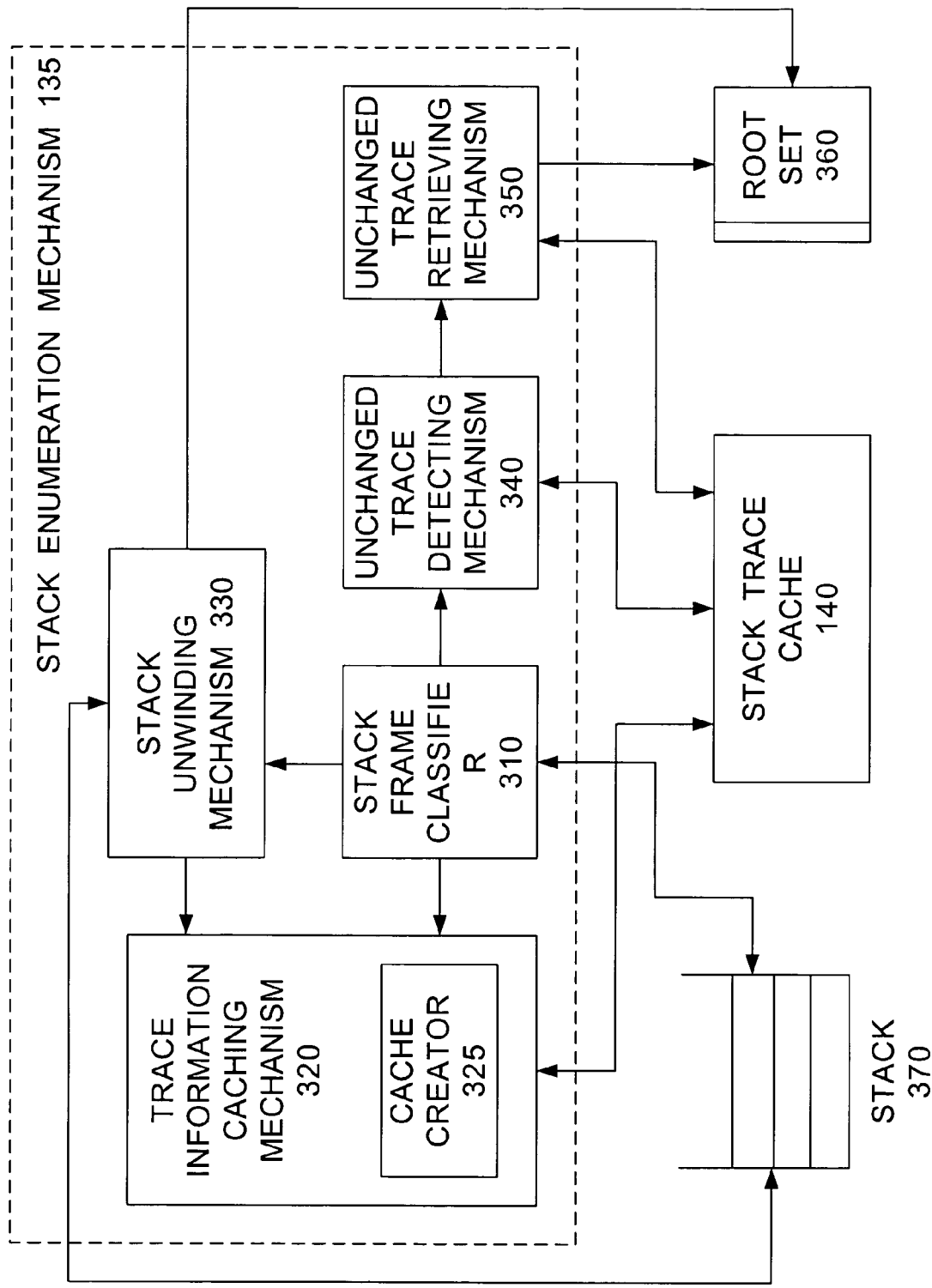
FIG. 3 is a high-level functional block diagram of a stack enumeration mechanism that uses a stack trace cache, according to an embodiment of the present invention.

FIG. 3 is a high-level functional block diagram of a stack enumeration mechanism that uses a stack trace cache, according to an embodiment of the present invention. The stack enumeration mechanism 135 may comprise a stack frame classifier 310, a trace information caching mechanism 320, a stack unwinding mechanism 330, an unchanged trace detecting mechanism 340, and an unchanged trace retrieving mechanism 350. The stack frame classifier 310 may use the value of an "in-cache" tag of a stack frame in a stack 370 to decide if the stack frame is newly generated (i.e., not cached) or has already been in a stack trace cache 140 (i.e., cached). The "in-cache" tag may be set up by a compiler when a call is initiated. When the stack frame associated with the call is created for the first time, the compiler may set the value of the "in-cache" tag to be false. When the stack frame classifier classifies a stack frame as "not cached," the stack unwinding mechanism 330 may perform normal stack unwinding for this frame (i.e., enumerate references in this frame and go to the next frame) and save live references in a root set 360. Subsequently, the trace information caching mechanism 320 may cache the trace information of the frame into the stack trace cache and change the value of the "in-cache" tag of the stack frame from false to true, i.e., the stack frame becomes cached. The trace information caching mechanism may comprise a cache creator 325 that creates a stack trace cache when stack enumeration is first conducted. In the second or later session of stack enumeration, the cache creator may modify the stack trace cache to accommodate newly generated and/or updated stack frames. The stack trace cache may comprise two areas: an identification area to store identifiers of stack frames and a list area to store live references enumerated in each stack frame. In one embodiment, cached stack trace information may be represented by the following data structure:

```
struct CachedStackFrame {
    <eip, esp> id; /* eip and esp represent IP and SP, respectively */
    Ref_List ref_list; /* cached enumerated references for this frame */
} cache[MAX_CALL_DEPTH];
``` where cache[MAX_CALL_DEPTH] array is a thread local object, that is, each thread has its own stack trace cache.

The trace information caching mechanism 320 may also comprise a identification component to identify each stack frame in a stack trace cache with values of a pair of registers, i.e., instruction pointer register (IP) and stack pointer register (SP). The IP may also be referred to as program counter (PC) and may be sufficient to point out source location and method name of a stack frame. The SP points to the current stack position. Since there may be multiple calls (with different stack positions) to a same method on the stack with the same IP (e.g., recursive calls), IP alone might not be able to identify a stack frame and SP may differentiate frames associated with these calls. Thus, using <IP, SP> may be desirable to identify a stack frame uniquely.

When the stack frame classifier 310 classifies a stack frame in the stack 370 as "cached" in the second or a later stack enumeration, the unchanged trace detecting mechanism 340 may search the stack trace cache from top to bottom and detect a starting frame of an unchanged portion of a stack trace. The starting frame of the unchanged portion in the stack trace cache may be detected when values of <IP, SP> of a frame in the stack trace cache is found to be equal to values of <IP, SP> of a current frame. When the starting frame of the unchanged portion is detected in the stack trace cache, the unchanged portion retrieving mechanism 350 may copy references in the unchanged portion directly to the root set 360 without further unwinding the stack.

Figure 4:
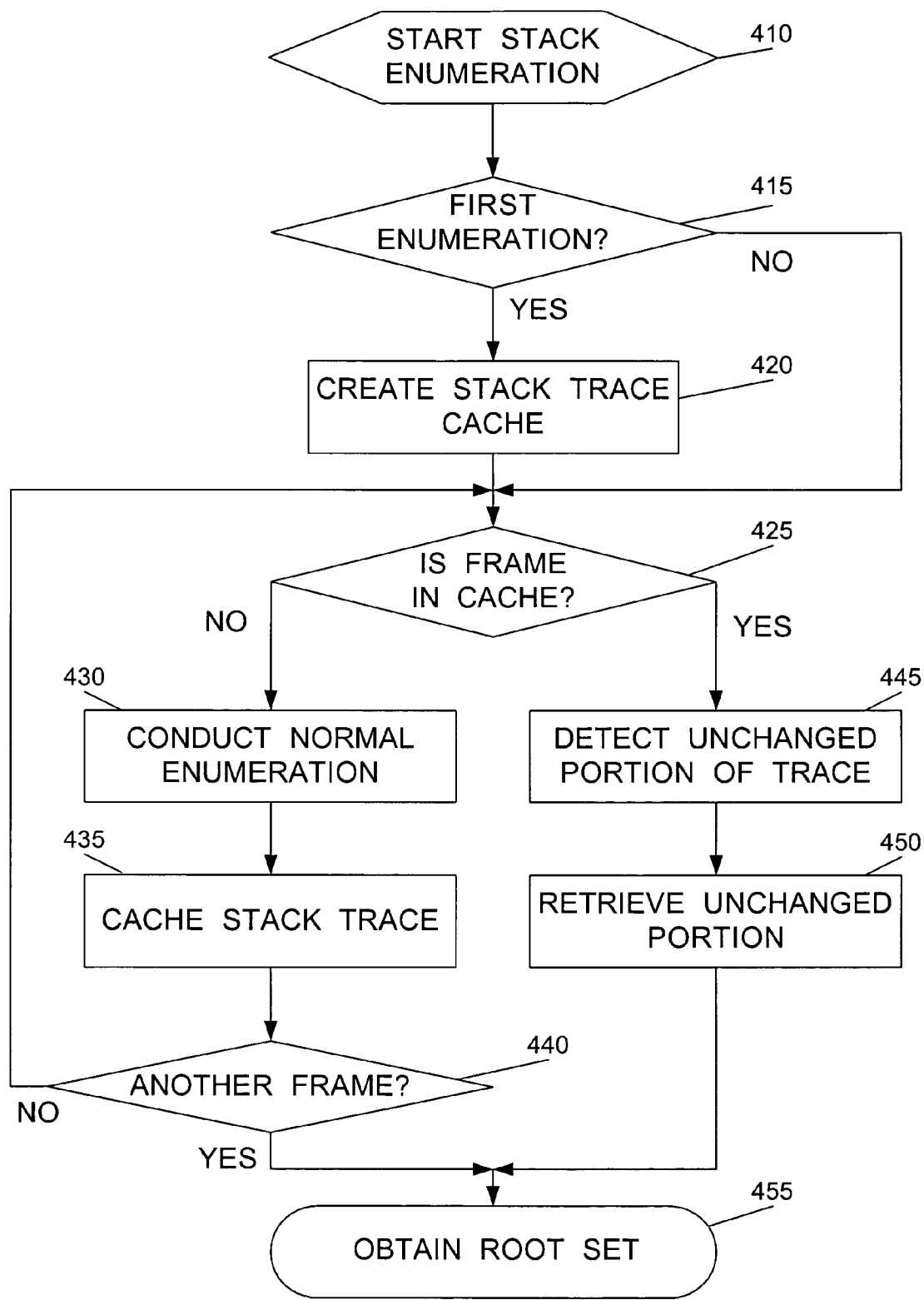
FIG. 4 is an exemplary flow diagram of a process in which a stack trace cache is created and used to improve the performance of root set enumeration during garbage collection for a thread, according to an embodiment of the present invention.
Figure 5A:
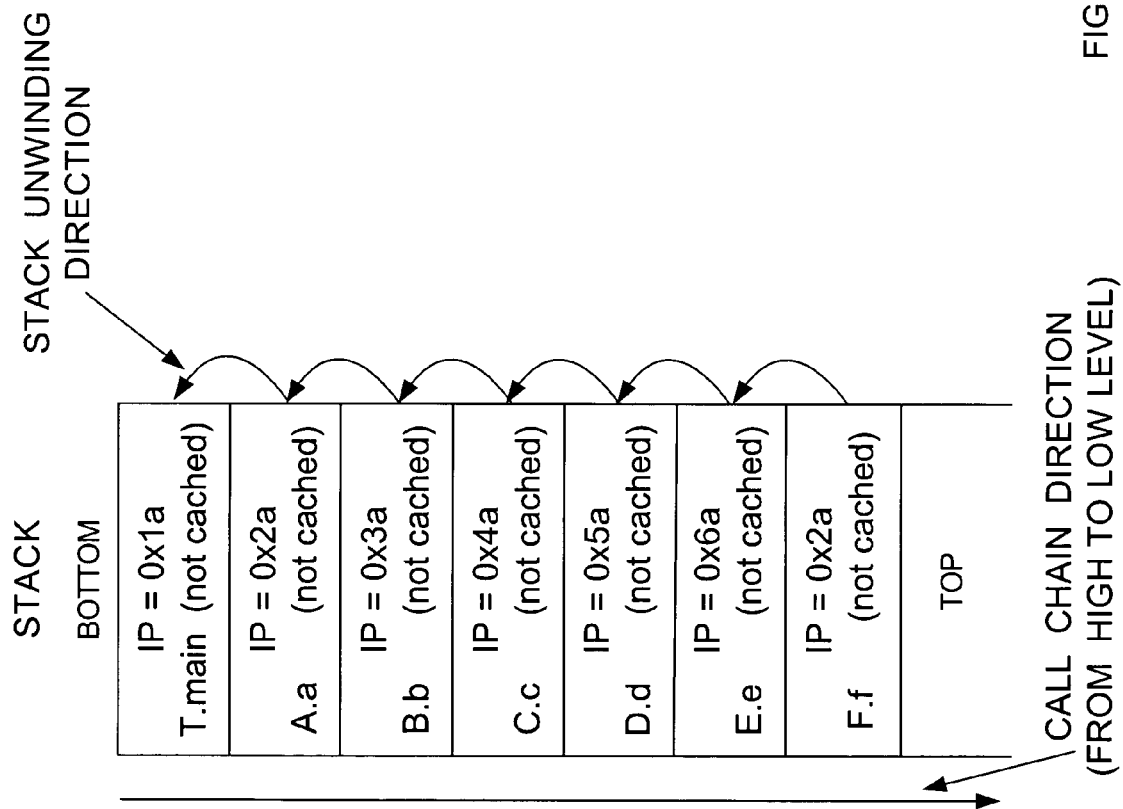
FIGS. 5(a)–(d) are schematic illustrations of the status of a stack trace cache during different sessions of stack enumeration for a thread, according to an embodiment of the present invention.
Figure 5B:
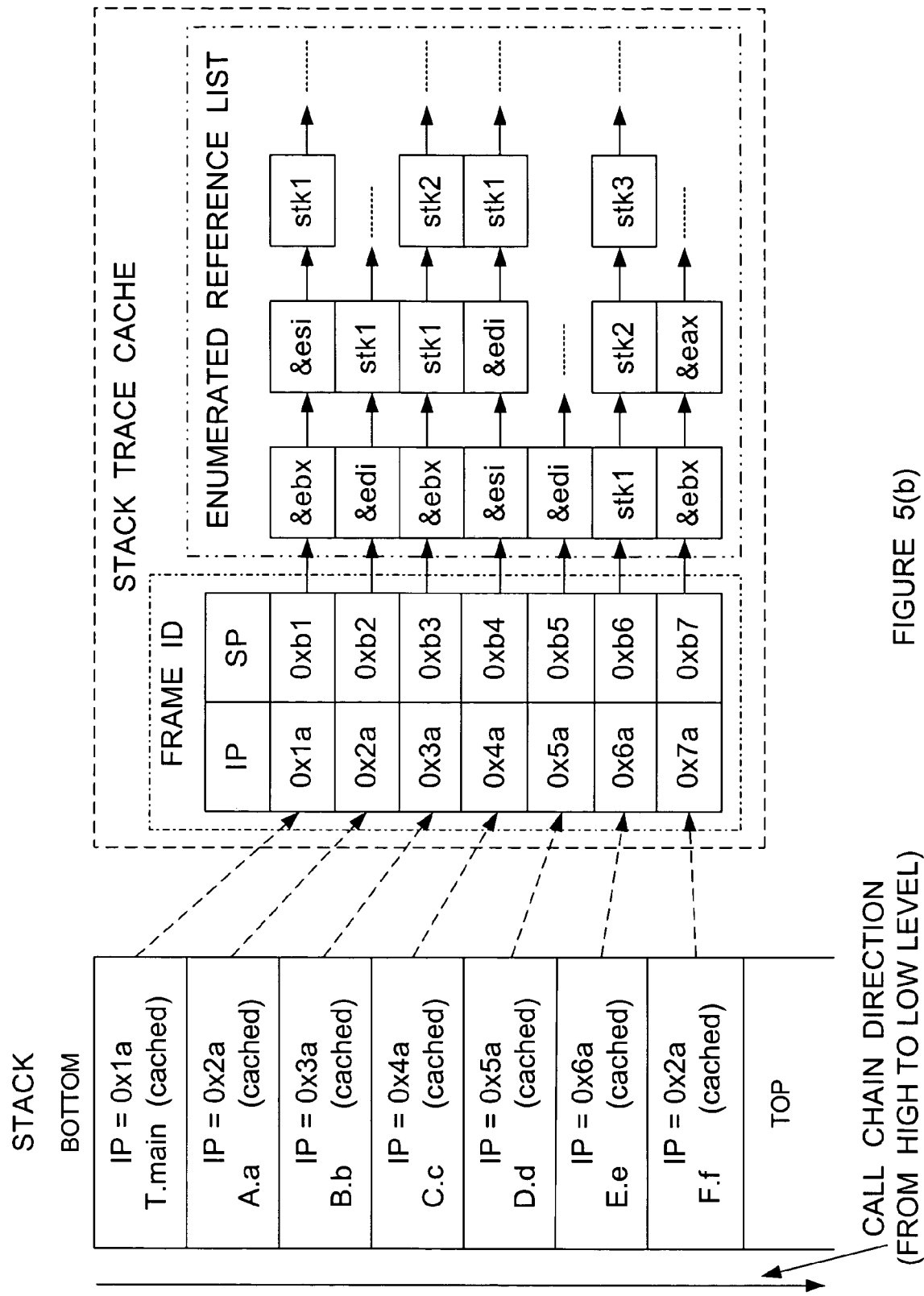
Figure 5C:
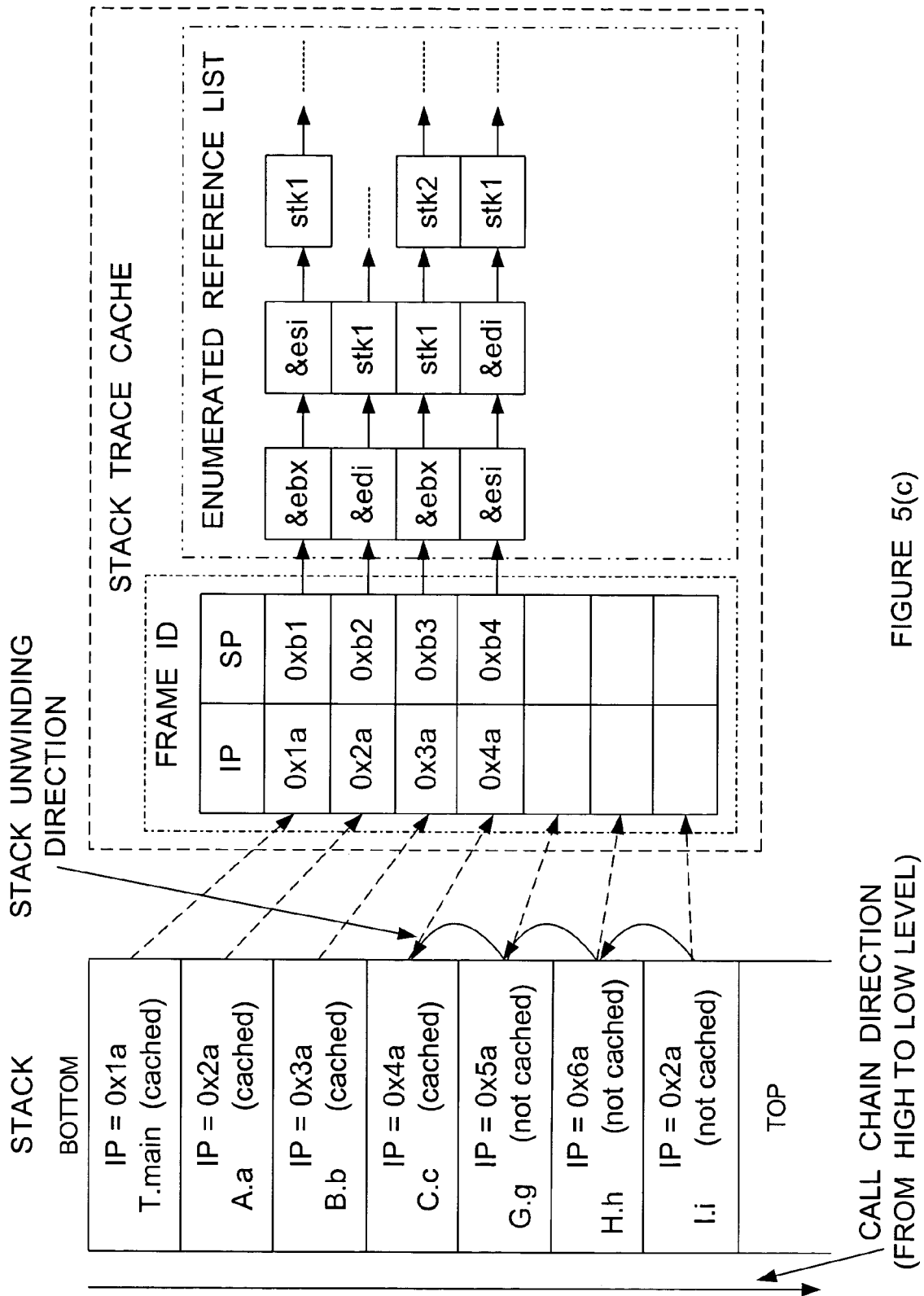
Figure 5D:
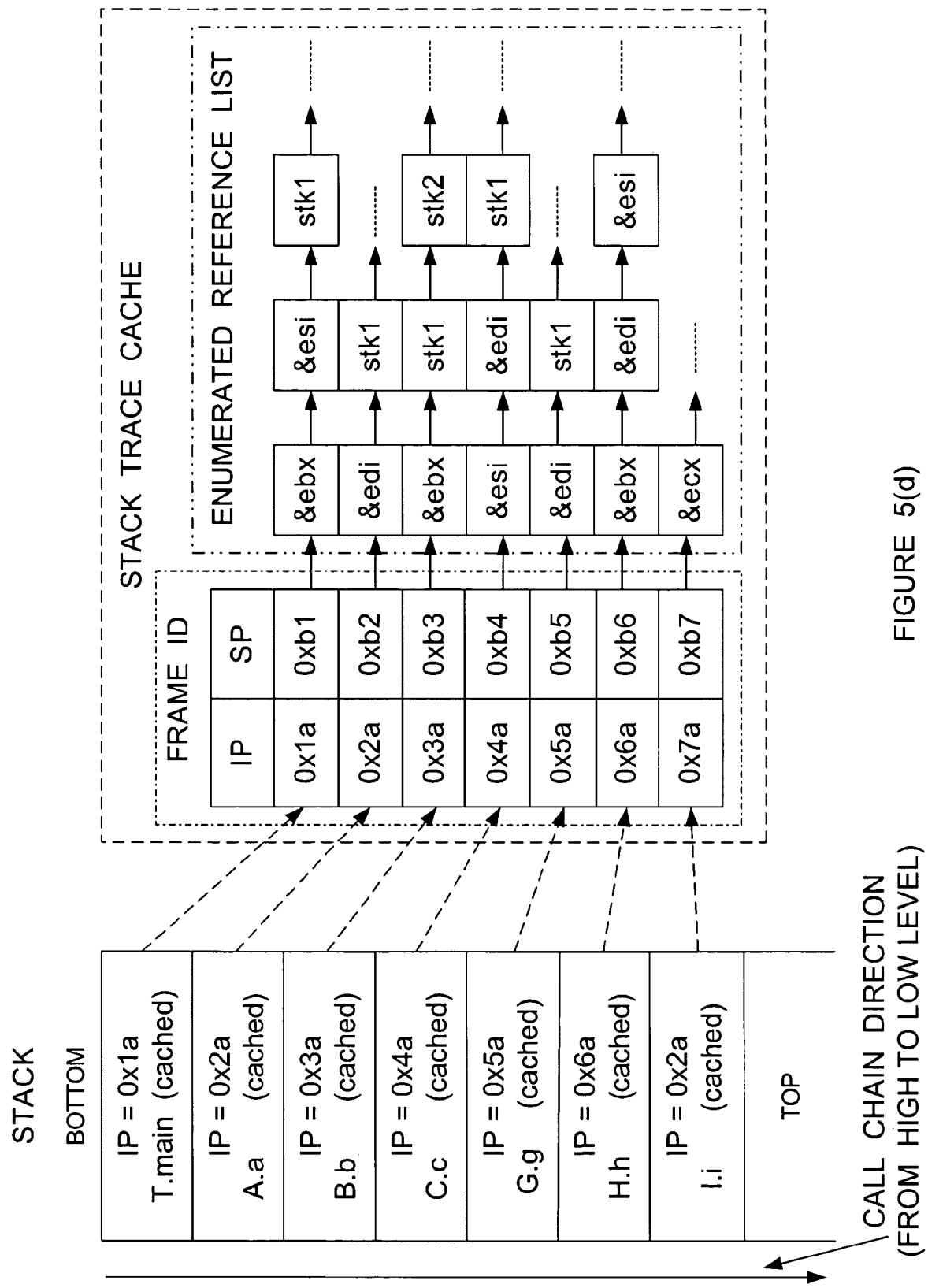

FIG. 4 is an exemplary flow diagram of a process in which a stack trace cache is created and used to improve the performance of root set enumeration during garbage collection for a thread, according to an embodiment of the present invention. At block 410, stack enumeration may be started. At block 415, a decision whether this is the first stack enumeration for the thread may be made. If this is the first stack enumeration for the thread, a stack trace cache may be created for the thread at block 420 before a frame in a stack is evaluated for enumeration starting at block 425; otherwise, frames in the stack may be evaluated (one by one) directly starting at block 425. At block 425, a frame in the stack may be checked to see if the frame is tagged "cached" or "not cached." If the frame is tagged "not cached," normal stack enumeration may be conducted at block 430, where stack unwinding may be started until a "cached" frame is reached in the stack. At block 435, trace information about frames that have been enumerated at block 430 may be cached and the frames may be tagged as "cached." The trace information may comprise an identifier for each frame and enumerated live references in each frame. The identifier of a frame may comprise values of IP and SP. At block 440, the stack is checked to see if there are any frames left to be enumerated. If there are, the next frame in the stack may evaluated at block 425 and the process between block 425 and block 455 (not including block 455) may be reiterated until no frame is left in the stack. If a frame is found "cached" at block 425, the stack trace cache may be searched to detect a starting point for an unchanged portion of a stack trace at block 445. Once the starting point of the unchanged portion has been detected, references in frames following the starting point in the stack trace cache may be copied to a root set at block 450, without further unwinding the stack. At block 455, references from all frames in the stack may be obtained.

The advantages of using a stack trace cache for stack enumeration may further be illustrated by comparing the process of normal stack enumeration and the process of stack enumeration using a stack trace cache. The former is illustrated by Pseudo Code 1, and the latter is illustrated by Pseudo Code 2.

Pseudo Code 1. Normal Stack Enumeration
© 2003 INTEL CORPORATION

```
1    Frame_Context context;
2       Ref_List allref = { }; /* stack enumeration result list */
3       ... ...
4       context.initialize_to_gc_suspend_point( );
5       while (not finished) {
6           normalize_if_necessary (&context);
7           /* perform normal stack enumeration */
8           Ref_List rl = enumerate (&context);
9           /* copy enumerated references into result list */
10          allref.append (rl);
11          finished = unwind_to_next_frame (&context);
12      }
```

In Pseudo Code 1, "Frame_Context" on line 1 represents a data structure of a call frame and contains information such as, for example, saved registers and spilled data. Before stack enumeration for a thread starts, "context" is initialized to a frame where the thread is suspended through "initialize_to_gc_suspend_point( )" in line 4. "normalize_if_necessary( )" in line 6 normalizes a frame's SP from its suspended position to its base position, if necessary. Enumeration of references in this frame may start from normalized SP position. At the end of enumeration for this frame, "unwind_to_next_frame ( )"

---

Pseudo Code 2. Stack Enumeration Using Stack Trace Cache
© 2003 INTEL CORPORATION

---

```
1    Frame_Context context;
2    Ref_List allref = { }; /* initialize stack enumeration result list */
3    /* temporary cache to save stack frames not in cache */
4    CachedStackFrame notcached[MAX_CALL_DEPTH];
5    ... ...
6    context.initialize_to_gc_suspend_point( );
7    while (not finished) {
8      if (context.in_cache == false) {
9        normalize_if_necessary (&context);
10       /* perform a normal enumeration */
11       Ref_List rl = enumerate (&context);
12       /* copy enumerated references into result list */
13       allref.append (rl);
14       /* add information of this frame to temporary cache */
15       add_to_cache (notcached, <context.eip, context.esp>, rl);
16       finished = unwind_to_next_java_frame (&context);
17     } else {
18       /* find the starting point of reusable trace in cache */
19       for (j = top; j >= 0; j--)
20         if (context.<eip, esp> == cache[j].<eip, esp>) break;
21       /* copy enumerated references in cache to result list */
22       for (; j >= 0; j--)
23         allref.append (cache[j].ref_list);
24       /* stop unwinding, and jump out of loop */
25       break;
26     }
27   }
28   /* update the cache with information in temporary cache */
29   update_cache (cache, notcached);
``` unwinds the stack to a caller's frame in a call chain and retrieve the caller's context. The enumeration process continues until all frames in the call chain are enumerated. In other words, Pseudo Code 1 illustrates a process of full stack unwinding.

Pseudo Code 2 differs from Pseudo Code 1 by utilizing a stack trace cache (shown in lines 18–25) to increase the opportunity of avoiding part or all of stack unwinding. Therefore, overheads incurred by stack enumeration using a stack trace cache may be smaller than overheads incurred by stack enumeration through full stack unwinding.

FIGS. 5(*a*)–(*d*) are schematic illustrations of the status of a stack trace cache in different sessions of stack enumeration for a thread, according to an embodiment of the present invention. FIG. 5(*a*) illustrates a stack before the first session of stack enumeration is started. When stack enumeration is invoked for the first time for a thread, all frames in the stack are tagged "not cached" by a compiler. Thus, full stack unwinding is performed during the first stack enumeration, after which all frames are tagged with "cached" because a stack trace cache has been created and enumerated references for each frame has been cached in the stack trace cache, as shown in FIG. 5(*b*). Each frame in the stack trace cache has an identification (id) area to store frame ids (i.e., values of IP and SP), and a list area to store enumerated references for each frame. FIG. 5(*c*) illustrates status of each frame in the stack and the stack trace cache in a later session of stack enumeration. When this later session of stack enumeration is initiated, it may be not necessary to perform full stack unwinding because some frames (e.g., 4 frames corresponding to methods T.main, A.a, B.b, and C.c in FIG. 5(*c*)) remain unchanged in the stack and may be directly retrieved from the stack trace cache without conducting stack unwinding. Only information for another three frames (i.e., frames corresponding to methods G.g, H.h, and I.i) are not cached. Thus only partial stack unwinding (up to the frame corresponding to method B.b) is needed. Additionally, the stack trace cache may be modified to cache information on frames being enumerated during the partial stack enumeration. FIG. 5(*d*) illustrates the status of the stack and the stack trace cache after this later session of stack enumeration.

Although the present invention is concerned with using stack trace caches for root set enumeration in a stack during garbage collection, persons of ordinary skill in the art will readily appreciate that the present invention may be used for reducing overheads incurred by any process involving stack unwinding such as, for example, exception handling, caller-callee relationship detecting, etc. Additionally, the present invention may be used for automatic garbage collection in any systems such as, for example, managed runtime environments running Java, C#, and/or any other programming languages.

Although an example embodiment of the present invention is described with reference to block and flow diagrams in FIGS. 1–5(*d*) and Pseudo Codes 1–2, persons of ordinary skill in the art will readily appreciate that many other methods of implementing the present invention may alternatively be used. For example, the order of execution of the blocks in flow diagrams or steps in pseudo codes may be changed, and/or some of the blocks in block/flow diagrams and the steps in pseudo codes described may be changed, eliminated, or combined.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprises hardware and operating systems. The hardware may comprise a processor, a memory, a bus, and an I/O hub to peripherals. The processor may run a compiler to compile any software to the processor-specific instructions. Processing required by the embodiments may be performed by a general-purpose computer alone or in connection with a special purpose computer. Such processing may be performed by a single platform or by a distributed processing platform. In addition, such processing and functionality can be implemented in the form of special purpose hardware or in the form of software.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer implemented method for automatically collecting garbage objects, comprising:
   performing root set enumeration in a stack of a thread using a stack trace cache;
   obtaining a root set by combining references obtained from root set enumeration for all threads;
   tracing live objects that are reachable from references in the root set; and
   reclaiming storage space occupied by objects other than the live objects.

2. The method of claim 1, wherein the root set comprises currently live references in stacks, registers, and other storage areas for all threads.

3. The method of claim 1, wherein performing root set enumeration in a stack of a thread using a stack trace cache comprises:
   determining if a stack frame is cached in the stack trace cache;
   detecting a portion of stack trace information that has not changed since the last stack enumeration in the stack trace cache and retrieving the unchanged portion from the stack trace cache, if the stack frame is cached in the stack trace cache; and
   performing normal root set enumeration in the stack, if the stack frame is not cached in the stack trace cache.

4. The method of claim 1, wherein tracing the live objects comprises marking the live objects and further scanning objects that are reachable from the marked objects.

5. A computer implemented method for performing root set enumeration in a stack of a thread for automatic garbage collection, comprising:
   initializing a stack enumeration list;
   creating a stack trace cache for the thread; and
   performing root set enumeration in the stack using the stack trace cache to produce an updated stack enumeration list.

6. The method of claim 5, further comprising tagging a stack frame to indicate whether the stack frame has been cached in the stack trace cache or is newly generated in the stack and has not been cached in the stack trace cache.

7. The method of claim 5, wherein the stack enumeration list comprises currently live references in the stack.

8. The method of claim 5, wherein creating the stack trace cache comprises:
   determining if the root set enumeration in the stack is performed for the first time;
   dynamically creating the stack trace cache and caching information of stack frames in the stack trace cache, if the root set enumeration in the stack is performed for the first time; and otherwise,
   reusing the stack trace cache for the root set enumeration in the stack.

9. The method of claim 8, wherein caching information of stack frames comprises adding an identifier to each frame using values of an instruction pointer register and a stack pointer register.

10. The method of claim 8, wherein reusing the stack trace cache comprises at least one of the following: using the stack trace cache without a change, and modifying the stack trace cache to accommodate new and updated stack frames.

11. The method of claim 5, wherein performing root set enumeration in the stack using the stack trace cache comprises:
    determining if a stack frame is cached in the stack trace cache based on a tag of the stack frame;
    copying an unchanged portion of stack trace information from the stack trace cache to the stack enumeration list, if the value of the tag indicates that the stack frame is cached in the stack trace cache; and otherwise
    performing normal root set enumeration in stack.

12. The method of claim 11, wherein copying the unchanged portion of the stack trace information comprises detecting a portion of the stack trace information that has not changed since the last stack enumeration in the stack trace cache and retrieving the unchanged portion from the stack trace cache.

13. The method of claim 11, wherein performing normal stack enumeration comprises:
    unwinding the stack until reaching a frame that is cached in the stack trace cache;
    caching information of unwound frames in the stack trace cache; and
    adding enumerated references from the unwound frames into the stack enumeration list.

14. A managed runtime system, comprising:
    a virtual machine;
    a just-in-time compiler;
    a root set enumeration mechanism capable of obtaining a root set;
    at least one stack trace cache capable of storing trace information of stack frames when the stack frames are enumerated during root set enumeration; and
    a garbage collector capable of tracing live objects reachable from the root set and reclaiming storage space occupied by objects other than the live objects.

15. The system of claim 14, wherein the root set enumeration mechanism comprises a stack enumeration mechanism capable of performing root set enumeration in stack.

16. The system of claim 14, wherein the stack trace cache comprises an identification area to store stack frame identifiers and a list area to store enumerated references for stack frames.

17. A computer implemented system for root set enumeration in a stack during garbage collection, comprising:
    a stack frame classifier capable of classifying a stack frame based on a tag of the stack frame;
    a stack information caching mechanism capable of caching information of the stack frame in a stack trace cache, if the value of the tag indicates that the stack frame is not cached;
    an unchanged trace detecting mechanism capable of detecting a portion of stack trace information that has not changed since the last stack enumeration in the stack trace cache, if the value of the tag indicates that the stack frame is cached; and an unchanged trace retrieving mechanism capable of retrieving the unchanged portion of stack trace information from the stack trace cache.

18. The system of claim 17, further comprising a stack unwinding mechanism capable of unwinding a stack until reaching a stack frame that is cached in the stack trace cache.

19. The system of claim 17, wherein the trace information caching mechanism comprises:
a cache creator capable of creating the stack trace cache when root set enumeration in the stack is performed for the first time; and
a frame identification component capable of identifying a frame in the stack trace cache.

20. An article comprising: a machine accessible medium having content stored thereon, wherein when the content is accessed by a processor, the content provides for automatically collecting garbage objects by:
performing root set enumeration in a stack of a thread using a stack trace cache;
obtaining a root set by combining references obtained from root set enumeration for all threads;
tracing live objects that are reachable from references in the root set; and
reclaiming storage space occupied by objects other than the live objects.

21. The article of claim 20, wherein the root set comprises currently live references in stacks, registers, and other storage areas for all threads.

22. The article of claim 20, wherein content for performing root set enumeration in a stack of a thread using a stack trace cache comprises content for:
determining if a stack frame is cached in the stack trace cache;
detecting a portion of stack trace information that has not changed since the last stack enumeration in the stack trace cache and retrieving the unchanged portion from the stack trace cache, if the stack frame is cached in the stack trace cache; and
performing normal root set enumeration in the stack, if the stack frame is not cached in the stack trace cache.

23. The article of claim 20, wherein content for tracing the live objects comprises content for marking the live objects and further scanning objects that are reachable from the marked objects.

24. An article comprising: a machine accessible medium having content stored thereon, wherein when the content is accessed by a processor, the content provides for performing root set enumeration in a stack of a thread for automatic garbage collection by:
initializing a stack enumeration list;
creating a stack trace cache for the thread; and
performing root set enumeration in the stack using the stack trace cache to produce an updated stack enumeration list.

25. The article of claim 24, further comprising content for tagging a stack frame to indicate whether the stack frame has been cached in the stack trace cache or is newly generated in the stack and has not been cached in the stack trace cache.

26. The article of claim 24, wherein the stack enumeration list comprises currently live references in the stack.

27. The article of claim 24, wherein content for creating the stack trace cache comprises content for:
determining if the root set enumeration in the stack is performed for the first time;
dynamically creating the stack trace cache and caching information of stack frames in the stack trace cache, if the root set enumeration in the stack is performed for the first time; and otherwise,
reusing the stack trace cache for the root set enumeration in the stack.

28. The article of claim 27, wherein content for caching information of stack frames comprises content for adding an identifier to each frame using values of an instruction pointer register and a stack pointer register.

29. The article of claim 27, wherein content for reusing the stack trace cache comprises at least one of the following: content for using the stack trace cache without a change, and content for modifying the stack trace cache to accommodate new and updated stack frames.

30. The article of claim 24, wherein content for performing root set enumeration in the stack using the stack trace cache comprises content for:
determining if a stack frame is cached in the stack trace cache based on a tag of the stack frame;
copying an unchanged portion of stack trace information from the stack trace cache to the stack enumeration list, if the value of the tag indicates that the stack frame is cached in the stack trace cache; and otherwise
performing normal root set enumeration in stack.

31. The article of claim 30, wherein content for copying the unchanged portion of the stack trace information comprises content for detecting a portion of the stack trace information that has not changed since the last stack enumeration in the stack trace cache and content for retrieving the unchanged portion from the stack trace cache.

32. The article of claim 30, wherein content for performing normal stack enumeration comprises content for:
unwinding the stack until reaching a frame that is cached in the stack trace cache;
caching information of unwound frames in the stack trace cache; and
adding enumerated references from the unwound frames into the stack enumeration list.

* * * * *

UNITED STATES PATENT AND TRADEMARK OFFICE
CERTIFICATE OF CORRECTION

| | | |
|---|---|---|
| PATENT NO. | : 7,089,273 B2 | Page 1 of 1 |
| APPLICATION NO. | : 10/632474 | |
| DATED | : August 8, 2006 | |
| INVENTOR(S) | : Wu et al. | |

It is certified that error appears in the above-identified patent and that said Letters Patent is hereby corrected as shown below:

Column 8, at line 20, delete "wilt" and insert --will--.

Signed and Sealed this

Twentieth Day of November, 2007

JON W. DUDAS
*Director of the United States Patent and Trademark Office*